(12) United States Patent
Murphy et al.

(10) Patent No.: US 9,301,500 B1
(45) Date of Patent: Apr. 5, 2016

(54) METHOD OF REMOVING HAIR FROM A PET AND GROOMING TOOL ASSOCIATE THEREWITH

(71) Applicants: Jodi Murphy, Stanhope, NJ (US); David Kastner, Stanhope, NJ (US)

(72) Inventors: Jodi Murphy, Stanhope, NJ (US); David Kastner, Stanhope, NJ (US)

(*) Notice: Subject to any disclaimer, the term of this patent is extended or adjusted under 35 U.S.C. 154(b) by 168 days.

(21) Appl. No.: 13/962,929

(22) Filed: Aug. 8, 2013

Related U.S. Application Data

(60) Provisional application No. 61/680,907, filed on Aug. 8, 2012.

(51) Int. Cl.
*A01K 13/00* (2006.01)

(52) U.S. Cl.
CPC .................................... *A01K 13/002* (2013.01)

(58) Field of Classification Search
CPC ...... A01K 13/00; A01K 13/002; A01K 13/04; A45D 24/04; A45D 24/10; A45D 24/36; A45D 19/02; A46B 5/02; A46B 2200/1093; B26B 19/24; B26B 21/16; B26B 21/18; B26B 21/521; B26B 21/4075
USPC .......... 119/601, 625, 627, 631, 633; 132/145, 132/148, 129, 150, 151; 30/57
See application file for complete search history.

(56) References Cited

U.S. PATENT DOCUMENTS

| | | | |
|---|---|---|---|
| 1,432,251 A * | 10/1922 | Lee ............................... | 132/117 |
| 1,695,765 A | 12/1928 | Howes | |
| 1,718,008 A * | 6/1929 | Segal ............................... | 30/57 |
| 2,034,340 A * | 3/1936 | Gaisman ................... | B26B 1/32 30/60 |
| 2,162,581 A | 6/1939 | Kapelman | |
| 3,308,500 A | 3/1967 | Woodruff | |
| 3,928,886 A | 12/1975 | Marino et al. | |
| 4,574,416 A | 3/1986 | Stewart et al. | |
| 4,617,875 A | 10/1986 | Holland | |
| 4,860,692 A | 8/1989 | Beard | |
| 5,022,350 A | 6/1991 | Sequist | |
| 5,339,840 A | 8/1994 | Koppel | |
| 5,862,780 A * | 1/1999 | Landreneau ................... | 119/616 |
| 6,055,938 A | 5/2000 | Klein | |
| 6,782,846 B1 | 8/2004 | Porter et al. | |
| 6,955,137 B2 | 10/2005 | Dunn et al. | |
| 7,077,076 B2 | 7/2006 | Porter et al. | |
| 7,222,588 B2 | 5/2007 | Porter et al. | |
| 7,334,540 B2 | 2/2008 | Porter et al. | |
| D565,258 S | 3/2008 | Porter et al. | |
| 7,509,926 B2 | 3/2009 | Porter et al. | |
| 7,650,857 B2 | 1/2010 | Porter et al. | |
| 7,717,067 B2 | 5/2010 | Porter et al. | |
| 2005/0134064 A1 | 6/2005 | Nies | |
| 2007/0084416 A1 | 4/2007 | Liao | |
| 2008/0066690 A1 | 3/2008 | Rosen | |
| 2009/0126648 A1 | 5/2009 | Porter et al. | |
| 2014/0026821 A1 * | 1/2014 | Tu ................................. | 119/600 |
| 2014/0026822 A1 * | 1/2014 | Harris, II ...................... | 119/628 |
| 2014/0041597 A1 * | 2/2014 | Van Der Poel ................ | 119/601 |

\* cited by examiner

*Primary Examiner* — David Parsley
*Assistant Examiner* — Danielle Clerkley
(74) *Attorney, Agent, or Firm* — Lawrence G. Fridman, Esq.

(57) ABSTRACT

A method is provided for removing hair from a furry pet by a grooming tool. The tool is formed with an elongate handle portion having a neck area. A blade guiding portion is positioned at the neck area and a blade assembly is pivotably connected to the blade guiding portion. The blade assembly consists of a blade with a front part having a set of teeth. The method comprising the steps of placing the blade in engagement with the pet, so that the front part with the teeth is positioned at an acute angle to the coat; and maintaining engagement of the blade with the pet to cause the blade to glide over a contour of the pet's body to engage and pull out hair from the pet.

14 Claims, 7 Drawing Sheets

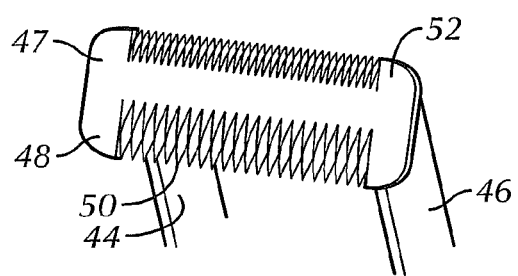
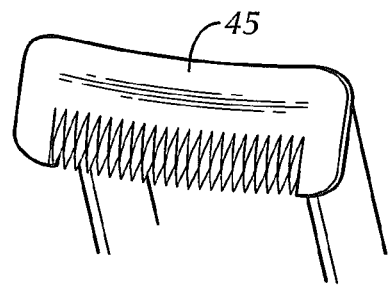
FIG. 2A  FIG. 2B
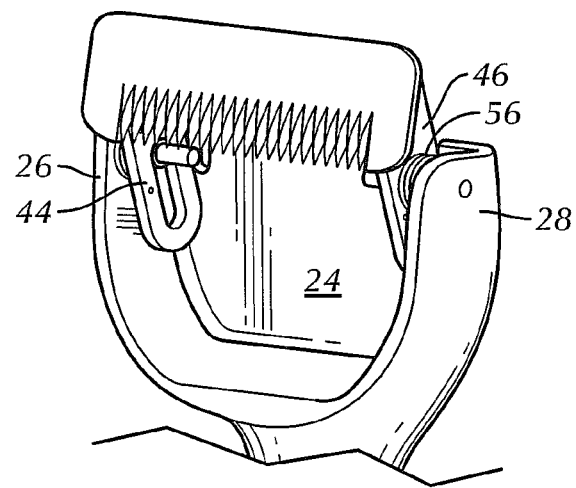
FIG. 4

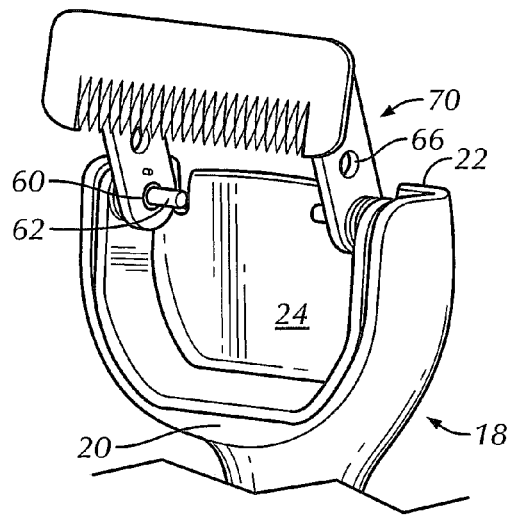
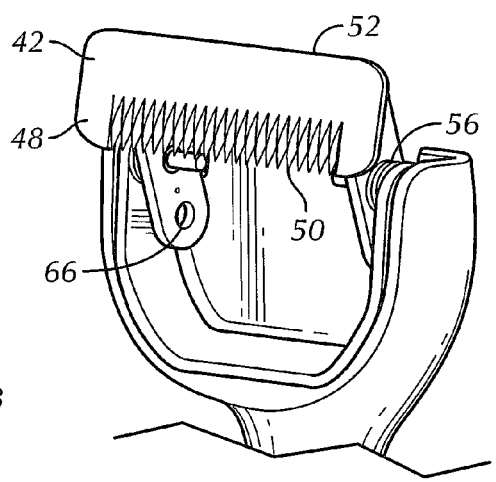
FIG. 3A　　　　　　　　　FIG. 3B
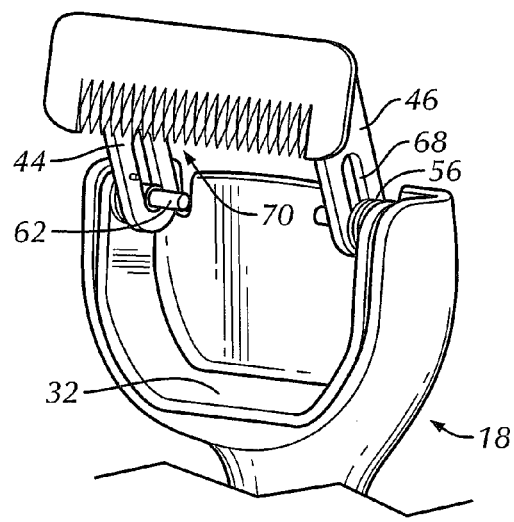
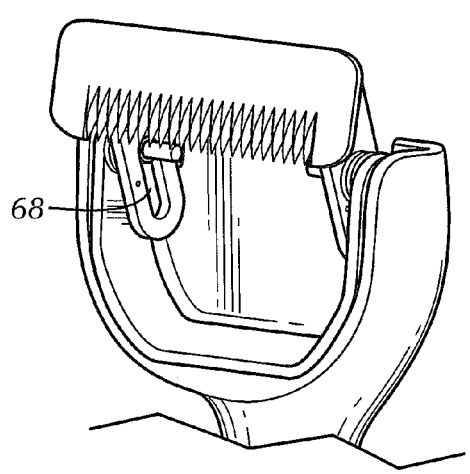
FIG. 3C　　　　　　　　　FIG. 3D

METHOD OF REMOVING HAIR FROM A PET AND GROOMING TOOL ASSOCIATE THEREWITH

REFERENCE TO RELATED APPLICATION

This Application claims priority of U.S. Provisional Application Ser. No. 61/680,907 filed by the inventors on Aug. 8, 2012, the entire disclosure of which is hereby incorporated by reference.

FIELD OF THE INVENTION

The present invention relates to the field of grooming domestic animals, in general, and more particularly it relates to a method of removing hair from a pet and a grooming tool associated with such method.

BACKGROUND OF THE INVENTION

Certain breeds of dogs and cats have the tendency of shedding their undercoat or coat, especially during the spring and summer months. Dogs and cats, whether kept indoors or outdoors, will go thru this natural process of hair regeneration, and will drop a great deal of loose hair within the house of the pet owner. This not only causes a mess, but can contribute to the pet becoming overheated due to the accumulation of expelled hair trapped within their coat. This is why coat maintenance and grooming is essential to keep a pet happy and healthy.

It is known that hair growth begins inside the hair follicle. The hair that is visible is the hair shaft. The base of the root is called the bulb, which contains the cells that produce the hair shaft. Other structures of the hair follicle include the oil producing sebaceous gland which lubricates the hair and the erector pili muscles. The hair growth cycle is divided into three phases: an anagen phase, in which the hair is growing actively with a very substantial level of cell proliferation occurring in the hair follicle; a catagen phase, when the follicle slows down its proliferative activity temporarily, detached from the bulb to permit hair development; and a telogen phase, in which the follicle simply stops growing, regresses and sheds out of the follicle, and a new anagen phase begins.

Domestic animals, such as dogs have primary hair and secondary hair. The secondary hair is the undercoat that sheds. The undercoat or loose hair is hair that has already been released from the follicles and accumulated within the coat. In actuality the undercoat is loose hair which already came out of follicle or will be released, but is sitting in the coat. According to the prior art, shed/loose hair can be brushed out relatively easily by utilizing conventional tools adapted to pull the loose coat which has already been out of the follicle and accumulated within the coat. Due to its association with the follicle, the primary hair can be pulled out of the follicle when it is ready to be released. One of the main objectives of the grooming tool and method of the invention is to pull/remove some of the primary hair which is at or near the end of its life cycle, yet still remains within the hair follicle as well as some of the secondary hair or undercoat. Pulling primary hair will stimulate the bulb in the follicle to reproduce another primary hair. This technique keeps the proper balance between primary and secondary hair.

As discussed above, the hair in the follicle is released at different stages. The first stage is when hair releases right from the root. The second stage is when hair starts to move out of the hair follicle. During the third stage the hair is ready to come out completely. The tool and the method of the invention are provided to assist the hair out of the follicle during the teleogen phase. The tool of the invention greatly aides to the situations where hair has already been detached from the root/bulb, and is ready to be pulled out from the hair follicle. It will also pull some primary coat, if it is ready to be released from the bulb.

There are known in the prior art grooming tools having a blade positioned at 90° angle to handle and to the outer surface of the coat. For proper operation of such devices a pressure has to be exerted on the blade to reach the undercoat hair. Many users, especially those with the limited grooming training, can be aggressive by applying a substantial pressure on the tool. In the prior art devices, not only the hair is being removed, but the skin of a pet is being scraped, damaged and irritated. The hair that remains on the pet is being scraped and damaged, when using a 90 degree angle oriented blade.

SUMMARY OF THE INVENTION

One of the objectives of the invention is to remove hair that has been released from the bulb of the hair follicle and all other coat that has already been expelled, yet sill remains trapped within primary coat and is at the stages where it is ready to be removed. In the invention, the blade glides over the coat gently pulling the hair out of the follicle which is ready to be released.

The unique feature of the tool allows the blade to float at the proper angle to be used by anyone regardless of skill level and can be used by left or right handed people, as long as the tool is used with the lay of the coat The tool and method of the invention are especially applicable for grooming specific breeds of dogs, cats, rabbits and horses having their hair follicle positioned at an oblique angle to the skin and allowing the coat to lie flat against the skin and to grow in the direction in which it lays. Among dogs which belong to this category are many sporting dogs, terriers, double coated breeds as well as others. It is also known that such oblique angle is about 30° or smaller. In the tool of the invention, the blade is adapted to float and glide following the natural orientation of the pet's hair, the above-discussed oblique angle and natural contour of the pet's body.

The floating blade of the invention, which glides along the outer coat of a pet at the predetermined angle, enables the user/operator to remove any and all coat that is ready to be removed in a natural and non-aggressive way. An essential aspect of the grooming method apparatus of the invention is an oblique angle at which the blade is positioned with respect to the surface of the coat. This angle corresponds to the oblique angle at which the hair follicles are positioned within the skin of certain breeds of dogs, cats and other animals as mentioned above. Since the blade follows the flow of the coat, and the way the coat lays, it will remove the coat naturally without irritation. The tool of the invention should not be used in the direction opposite to the direction at which hair of a pet is oriented.

The prior art grooming tools are often formed with the blade oriented at a 90° angle to the handle. A substantial pressure has to be applied by an operator enabling the teeth of such blades to penetrate through the primary coat to the undercoat. Such pressure often causes a substantial damage to the skin of the pet as well as a scraping effect on the hair itself. In the tool of the invention, the blade and the teeth are positioned at an acute oblique angle or less to the coat of a pet. In this manner, the tool combs at an oblique angle in which corresponds to the angle of the follicles at the skin of the specific breeds of cats and dogs discussed above. The specially designed grooves which are associated with the teeth of the blade feed the coat into the teeth, further facilitating a gentle pull of the coat in a safe and mild manner.

One of the essential aspects of the tool and the method of the invention is to remove hair which is still within the follicle and the hair that has been released from the follicle and is trapped within the coat. This hair is already detached from the bulb and is at the later stages of the life of a coat as discussed above. One of the main objectives of the invention is to address the hair which has been detached from the bulb but still within the follicle. The tool of the invention enables the operator to remove the hair gently, stimulating release of oil from the follicle, so as to encourage a new hair growth and to promote healthy skin.

BRIEF DESCRIPTION OF THE DRAWINGS

Exemplary embodiments of the invention will be now described in greater detail below with reference to the accompanying drawings, in which:

FIG. 2A is a semi-perspective view of another embodiment of the blade;

FIG. 2B is a semi-perspective view of a further embodiment of the blade;

FIG. 3A is a perspective view showing of the one position of the adjusting arrangement;

FIG. 3B is a prospective view showing another position of the adjusting arrangement;

FIG. 3C is a perspective view showing one position of another embodiment of the adjusting arrangement;

FIG. 3D is a perspective view showing another position of the adjusting arrangement of FIG. 3C;

FIG. 4 is a perspective view showing an alternate embodiment of the receiving cavity;

DETAILED DESCRIPTION OF THE INVENTION

Figure 1:
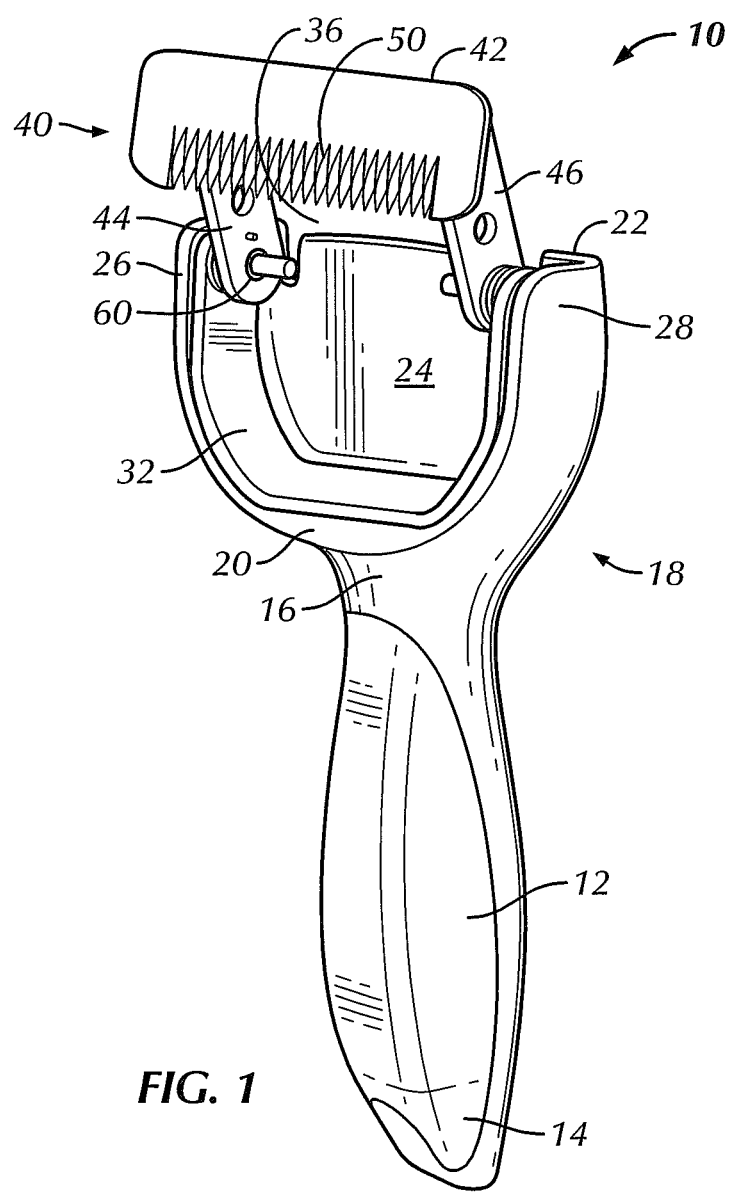
FIG. 1 is a perspective view of the grooming tool of the invention.

Referring now to the drawings in general and to FIG. 1-5 in particular illustrating the pet grooming tool 10 of the invention. A handle 12 configured for convenient positioning in a hand of an operator extends between a rear end 14 and a neck portion 16. The blade guiding portion 18 is provided at the neck portion and is formed with a proximal part 20 connected to the neck portion and a distal part 22 facing a blade assembly 40. The blade assembly 40 is pivotably mounted to the blade guiding portion 18.

A receiving cavity 24 extends within the guiding portion 18 between the proximal and distal ends thereof. The receiving cavity 24 is defined by sidewalls 26 and 28 interconnected by the top wall 30.

The blade assembly 40 consists of a blade 42 with connecting arms 44, 46 extending outwardly therefrom on both sides of the blade. The blade 42 is positioned at an angle to the connecting arms. In one embodiment, the blade 42 is a substantially flat solid component with a front portion part 48 having a set of teeth 50 and a rear part 52. The grooves formed within the blade feed the hair into the teeth. It will be discussed below that in use, the blade and the teeth are oriented at an acute angle A to the coat of a pet. Although the angle A may vary in the preferred embodiment, it is within the range between 22° and 30°. In this manner, the tool combs with the blade and teeth being positioned at an acute oblique angle, which corresponds to the angle of the follicles at the skin of the specific breeds of cats and dogs discussed above.

In one embodiment of the invention, the teeth of the blade are not sharp, so as to further facilitate pulling hair out of the follicle without cutting the hair.

Although a substantially flat blade has been discussed above, it should be understood that blades having various configurations are within the scope of the invention. It is illustrated in FIG. 2B that in an alternate embodiment the blade 45 is formed having a curvature or a bend facilitating engagement of the blade with various parts of pet's body, especially those which are not completely flat. In this embodiment the curvature or bend extends throughout the body of the blade. On the other hand, the curvature can be limited to the front portion of the blade. The curved blade further enhances the ability of the tool to follow closely a contour of the pet's body.

As illustrated in FIG. 2A, the teeth 50 can be formed not only at the front 48, but also at the rear part 52 of the blade 47. For example, medium teeth can be provided at the front, with course teeth forming the rear part of the blade.

In one embodiment of the invention, as shown in at least FIGS. 1 and 3A-3D a frame 32 is positioned within the receiving cavity 24 to facilitate assembly of the tool. The frame 32 follows an inner periphery of the receiving cavity 24, including the side walls 26, 28. The blade assembly 40 is mountable to the frame 32 and the guiding portion 18 at a mounting location, so as to define a pivot joint 60 enabling pivotal movement of the blade assembly with respect to the guiding portion 18 and the handle 12. The overall shape of the connecting arms 44, 46 is determined by the need for the blade assembly to perform its function and also to facilitate longitudinal adjustment and pivotal motion of the blade relative to the handle. At the pivot joint 60 the connecting arms 44, 46 are connected to side portions of the frame 32 and to the receiving cavity 24 by a member 62. In one embodiment of the invention the member 62 is a conventional fastener, including but not limited to screws, rivets, bolts, pins, quick-release fasteners, spring-loaded detents and the like. The pivot joint allows the user quickly and easily to adjust the tool 10 from one operating position to another operating position.

In the assembled condition, the front part of the blade 48 is spaced from the distal part 22 of the guiding section 18 by an operational gap 36. The gap 36 can be adjusted by the adjusting arrangement 70 facilitating a longitudinal motion of the connecting arms 44, 46 in either direction with respect to the pivotal joint 60. By adjusting the operational gap 36 or the distance between the blade and the guiding portion, the tool of the invention can accommodate a variety of pets having different length and other hair characteristics.

In the embodiment illustrated in FIGS. 3A and 3B, the adjusting arrangement 70 is formed by a plurality of openings 66 formed in the connecting arms, which are adapted for respective engagement with the member 62. The respective openings in the side portions of the frame may be also provided. In another embodiment, as illustrated in FIGS. 3C and 3D, longitudinal slots 68 are formed within the connecting arms 44, 46 to facilitate longitudinal motion of the blade 42 relative the guiding portion 18.

A biasing arrangement is provided to perform the self-adjusting function of the tool, so as to facilitate returning the blade assembly 40 to the predetermined inclined position. As shown in FIGS. 1 and 3A-3D in one embodiment, the biasing arrangement is in the form of a coil spring 56 provided at the pivot joint 60.

Figure 5:
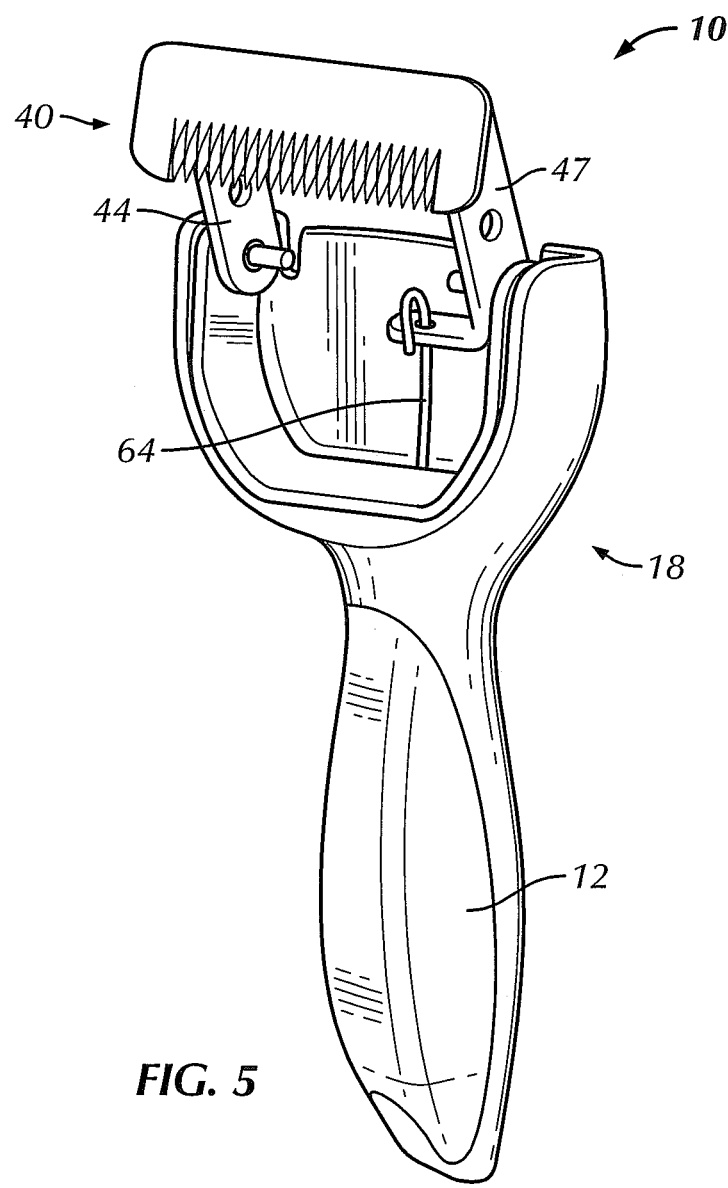
FIG. 5 is a perspective view of the grooming tool having an alternate arrangement of the biasing arrangement.
Figure 5A:
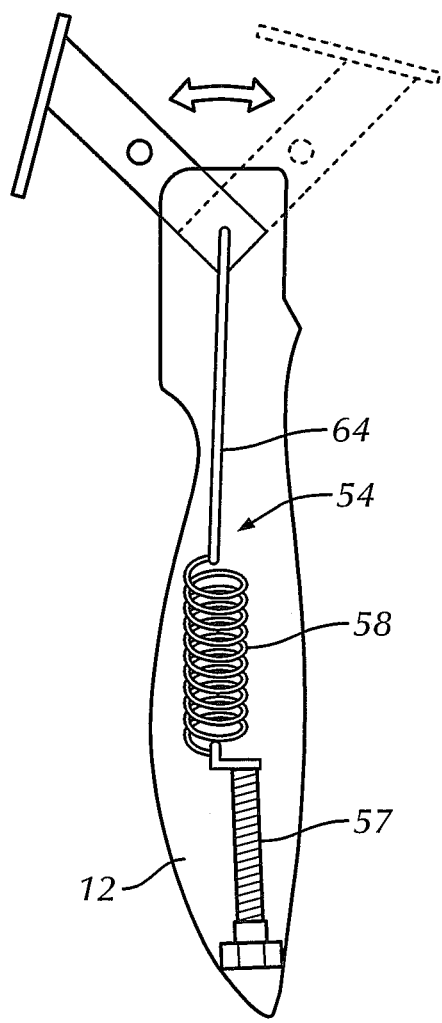
FIG. 5A is a schematic diagram illustrating operation of the biasing arrangement of FIG. 5.

Another biasing arrangement in the form of an elongated spring 58 positioned within the handle 12, as illustrated in FIGS. 5 and 5A. A connecting member or rod 64 extends from one side of the spring 58 to one of the connecting arms 47 of the blade assembly. The other end of the spring is associated with the adjustable tension knob 57 provided to adjust characteristics of the spring 58.

It should be understood, however that other ways of creating the pivotal connection between the blade assembly and the receiving cavity are within the scope of the invention. For example, the embodiment illustrated in FIG. 4, the receiving cavity 24 is formed without the frame. Thus, a pivot joint is formed at the side walls 26, 28 of the receiving cavity. In this manner, the connecting arms are disposed in the close vicinity of and spaced from the side walls of the receiving cavity and the exterior surfaces of the arms 44, 46 face the side walls.

In a further embodiment, where a wide version of the blade assembly with the increased distance between the connecting arms is utilized, an exterior pivotal connection between the blade assembly and the receiving cavity is formed. In the assembled condition of this embodiment, the inner surfaces of the connecting arms face the outer areas of the side walls.

Although the blade assembly has been discussed above with a specific design of the blade and teeth, it should be understood that various designs of the teeth and spaces between the teeth are within the scope of the invention. For example, the blade can be provided having fine, medium and course teeth. Furthermore, in the invention, the blade is removable, interchangeable and reversible. Such removable, interchangeable functions can be accommodated by a special design of the blade assembly, wherein the blade can be removably attached to the arms by means of fasteners or any other conventional means. The pivotal arrangement of the invention simplifies removal and replacement of the blade. In this manner, use of the tool with different types of teeth and blades is applicable to most breeds discussed above and to facilitate operation of the tool by an operator with various degrees of experience.

Figure 6:
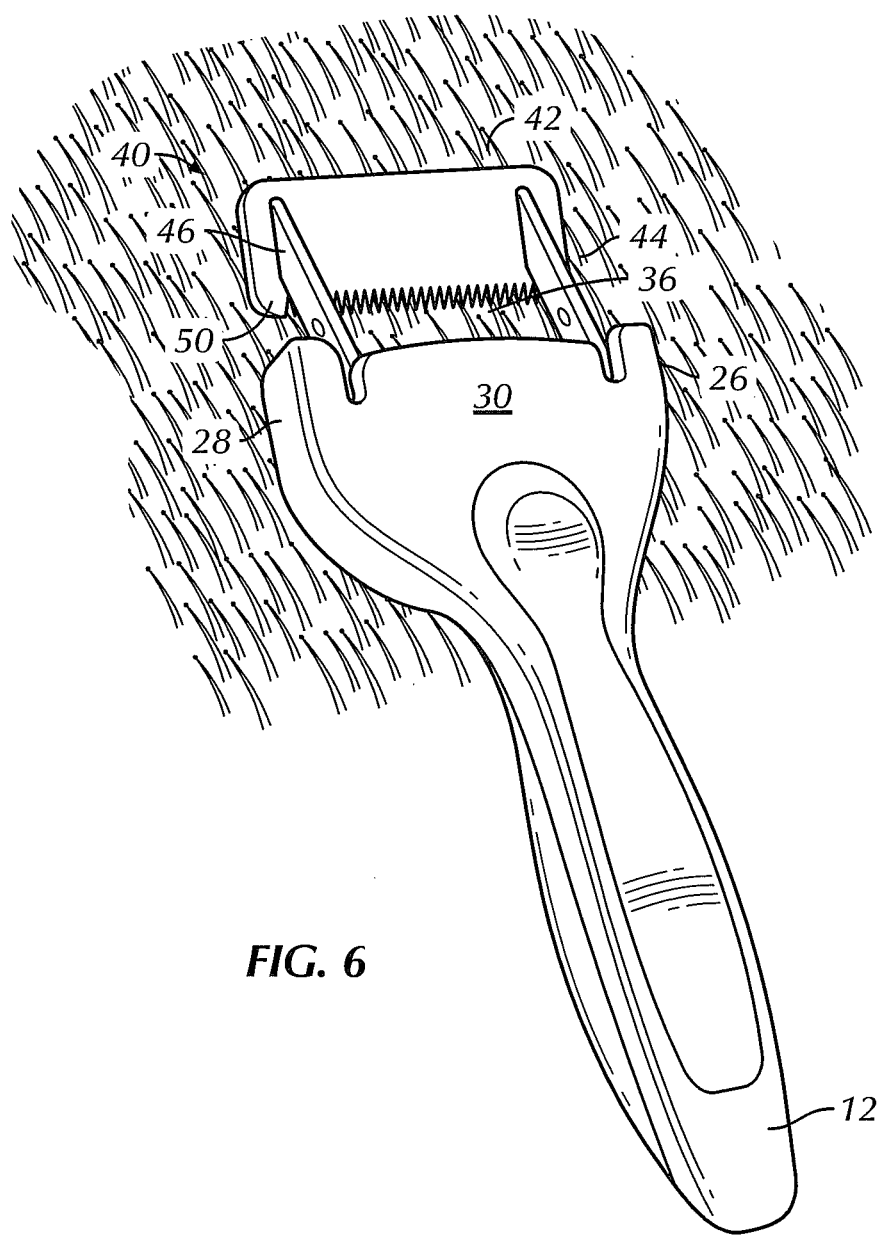
FIG. 6 is a perspective view of the grooming tool of the invention in use.
Figure 7:
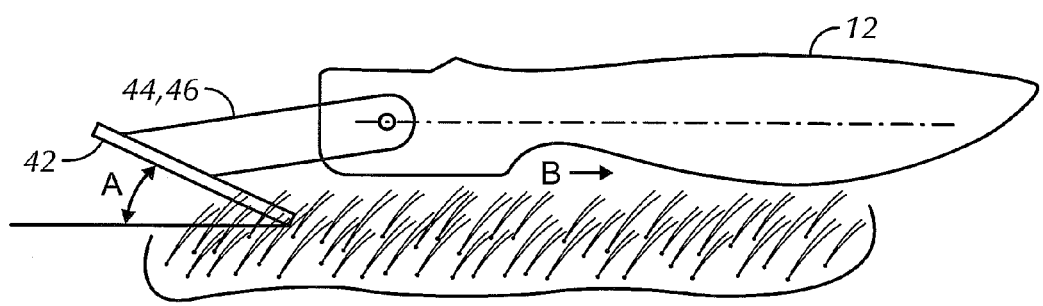
FIG. 7 is a schematic diagram illustrating a method of the invention.

According to the method of the invention as illustrated in FIGS. 6 and 7, to remove hair from a pet, a user initially places the blade guiding section 18 including the receiving cavity 24 and the blade 42 of the pet grooming tool 10 on the pet's coat. In this position, the blade 42 including the front portion 48 with the teeth 50 is positioned at the acute angle A to the coat surface. As the operator pulls the handle 12 generally along its longitudinal axis, in the direction of Arrow B shown in FIG. 7, the blade 42 trails the blade guiding portion 18. Due to the pivotal joint 60, the tool of the invention is self-adjusting, and the angular orientation of the blade relative to the pet's coat is maintained through the grooming process. Pulling the pet grooming tool 10 causes the blade 42 to engage the non-loose hair of the pet and to remove it from the coat.

According to another aspect of the method of the invention, the tool guiding section 18 is positioned on the pet's body with the receiving cavity facing the coat. Upon movement of the tool by the operator, the substantially hollow cavity 24 receives the pet's hair and directs such hair to the blade assembly 40. This motion is facilitated by the pivotal connection 60, so that the blade glides following the natural contour of the pet's body. During this gliding motion, the blade 42 is oriented and engages the hair of the pet at the oblique angle A. In the preferred embodiment, this angle does not exceed 30°, so as to correspond to the angle at which the hair follicles are positioned within the body of the breeds discussed above.

Due to the pivotal connection between the blade 42, the guiding portion 18 and the handle 12, the angular orientation of the blade is self-adjusting, so as to follow a natural contour of the respective part of the pet's body.

As to another aspect of the method of the invention, as the handle is being pulled longitudinally, due to the gliding motion of the blade 42 along the pet's body, the pressure exerted by the operator through the tool on the pet's body is minimized. In many instances, the operator does not apply any pressure to the blade. Thus, injury to the pet's skin is minimized. In the prior art where the blade is positioned at a 90° angle to the skin, a pressure must be applied to the blade for a tool to function appropriate, especially when the undercoat has to be reached.

Thus, the invention provides a safe and non-aggressive method of grooming a pet, where the blade freely follows, gliding along the pet's body with a minimal pressure being applied on the blade. During the gliding motion, the angular oriented blade combs through the outer coat without damaging the skin of a pet.

Due to the self-adjusting function, the blade 42 glides over the top coat/hair, so as to remove the live hair positioned on top of the coat, supported by the follicles, with a limited effect on the hair positioned at the bottom. In the method of the invention, the blade pulls out hair which has already been released from the follicle, i.e., hair which has been detached from the bulb, but still remains within the follicle. The non-aggressive gliding motion of the blade pulls out such hair gently, so as to stimulate release of oil from the follicle and encourage new hair growth.

There are known many prior art grooming tools which require substantial application of a pressure by the operator on the tool, so as to engage the coat and pull the coat out. In such prior art tools, the users have to determine and maintain the required angle of the blade during the grooming process. With the tool and method of the invention, the confusion is minimized, if not completely eliminated. According to the invention, due to the pivotal connection and the gliding motion of the blade, the required angle will be automatically set and adjusted. This self-adjusting angle will be the correct angle for removing this type of coat out of the hair follicle, corresponding to the oblique angle of positioning the follicles in the skin of an animal.

It should be understood that the method and the grooming tool of the invention are not limited to just the care and grooming of dogs and cats but can be used on a wide variety of domestic animals. The animal grooming tool 10 shown in the drawings and described in detail herein, disclose arrangements of elements of particular construction and configuration for illustrating preferred embodiments of structure and method of operation of the present device. It is to be understood, however, that elements of different construction and configuration and other arrangements thereof, other than those illustrated and described, may be employed for providing an animal grooming tool 10 in accordance with the spirit of this invention, and such changes, alternations and modifications as would occur to those skilled in the art are considered to be within the scope of the combination animal grooming tool as broadly defined in the appended claims.

The invention claimed is:

1. A method of removing hair from a furry pet by a grooming tool having an elongate handle portion extending generally along a longitudinal axis, said handle portion having a neck area, a blade guiding portion provided at the neck area having a receiving cavity, a blade assembly pivotally connected to the blade guiding portion, said blade assembly having a blade with a front part provided with a set of teeth and connecting arms extending outwardly from opposing ends of the blade, an operational gap formed between the blade guiding portion and the front part of the blade, an adjusting arrangement within each said connecting arms for adjusting said operational gap by facilitating longitudinal adjustment of said blade assembly with respect to said blade guiding portion, and a pivoting unit formed between the connecting arms and the blade guiding portion;

the method comprising the steps of:

placing the blade guiding portion with the receiving cavity on a coat of a furry pet, so that the blade contacts the coat in such a manner that the blade including the front part with the teeth are positioned at an acute angle to the coat; and moving the handle portion generally along said longitudinal axis thereof, while maintaining engagement of the blade with the coat to cause the blade to glide over the coat to engage the hair and to pull said hair from the coat; wherein said blade assembly is pivoted with respect to the blade guiding portion at the pivoting unit between the blade assembly and the blade guiding portion, so that said angular orientation of the blade assembly is self-adjusted following the motion of the handle along the pet's body.

2. A method according to claim 1, wherein during said gliding motion, said blade assembly is oriented and engages the hair at the acute angle not exceeding 30°.

3. A method according to claim 2, wherein said angle corresponds to an angle of positioning hair follicles within the pet's body.

4. A method according to claim 1, wherein the receiving cavity is defined by side walls and a top wall interconnecting the side walls, the method comprising a further step of receiving said hair within the receiving cavity and directing said hair to the front part of the blade assembly including the teeth.

5. A method according to claim 4, wherein in the step of receiving said hair within the receiving cavity, the hair is accumulated between said side walls of the receiving cavity.

6. A method according to claim 1, wherein during the gliding motion of the blade, a pressure applied by an operator through the tool to the pet's body is minimized, so as to avoid injury to the skin of the pet; and the blade pulls out and removes the hair which has been detached from its hair bulb, but still remains within respective follicles, occurring in a non-aggressive way to simulate release of oil from the follicle and encourage new hair growth.

7. A method according to claim 1, said method comprising a further step of adjusting said operational gap by means of the adjusting arrangement, so that upon adjusting the operational gap a distance between the blade and the blade guiding portion is adjusted to accommodate various lengths and configurations of the pet's hair.

8. A pet grooming tool for removing hair from a coat of a furry pet, the grooming tool comprising:

an elongated handle extending generally along a longitudinal axis thereof and having at least a neck area, a blade guiding portion provided at the neck area, a receiving cavity extending within the blade guiding portion and defined by side walls and a top wall interconnecting the side walls, a blade assembly having a blade extending between a pair of connecting arms, each of the connecting arms having a first end extending outwardly from the blade and a second end pivotally connected within the receiving cavity to one of the side walls, and the blade including a front part having a set of teeth and a rear part;

an operational gap formed between the blade guiding portion and the front part of the blade, an adjusting arrangement for adjusting said operational gap including an adjusting portion formed within each said connecting arms for longitudinal adjustment of the blade assembly with respect to the blade guiding portion;

a pivoting unit formed between the connecting arms and the side walls of the receiving cavity for pivotal motion of the blade assembly relative to the blade guiding portion; and the blade being oriented with respect to the handle portion such that moving the handle portion along the longitudinal axis promotes the pivotal motion of the blade assembly and engagement of the blade with the pet's hair and causes said set of teeth to engage the coat and pull the hair out from the coat.

9. A grooming tool according to claim 8, wherein said operational gap is adjusted by means of sliding the connecting arms about the pivoting unit, so that upon adjusting the operational gap a distance between the blade and the blade guiding portion is adjusted to accommodate various lengths and configurations of the pet's hair.

10. A grooming tool according to claim 8, wherein the adjusting portion consists of a plurality of openings formed in each said connecting arm, said openings are adapted for receiving a connecting member providing connection between the blade guiding portion and the blade assembly.

11. A grooming tool according to claim 8, wherein the adjusting portion is in the form of a slot extending within each said connecting arm, said slots are adapted for engaging a connecting member providing connection between the blade guiding portion and the blade assembly.

12. A grooming tool according to claim 8, wherein said blade is formed having a substantially flat body; and said teeth are formed at the front part and a rear part of the blade.

13. A grooming tool according to claim 8, further comprising a frame extending along the side walls of the receiving cavity, said adjusting arrangement formed at said frame.

14. A grooming tool according to claim 8, wherein said blade is formed having a curved body with the set of teeth at the front portion of the blade.

* * * * *